United States Patent Office 3,498,882
Patented Mar. 3, 1970

3,498,882
METHOD OF MAKING A ZINC LIPASE COMPLEX
Saul Rogols, Circleville, and Robert L. High, Canal Winchester, Ohio, assignors to The Keever Company, Columbus, Ohio
No Drawing. Filed Oct. 10, 1966, Ser. No. 585,245
Int. Cl. C12b 1/00
U.S. Cl. 195—7                    12 Claims

ABSTRACT OF THE DISCLOSURE

A process in which a lipase enzyme preparation is starch or starch hydrolysate and the treated starch can be containing complex. The complex can be used in treating starch or starch hydrolyzate and the treated starch can be further treated with an amylase.

---

This invention deals with a modified enzyme; that is an enzyme which has been chemically modified in a manner to alter certain of its significant properties. In a specific embodiment the invention deals with a novel enzyme complex in which zinc is associated with a lipase in a manner such that the zinc-lipase complex effects unique chemical and physical changes in an atypical substrate molecule containing inherent lipid fragments.

It is well known that lipases can be used in the degradation of lipids. We have found and have disclosed (copending application Ser. No. 542,502 filed Apr. 14, 1966) that the action of a lipase on a lipid can yield unique results if the lipid is an atypical fragment of a natural product molecule such as a lipid fragment of a starch molecule or the lipid fragment of a protein molecule. When an effective proportion of a lipase is brought into contact with a starch molecule or a starch hydrolysate molecule, for example, the latter substrate molecule undergoes a unique configuration change and becomes uniquely activated for subsequent reactions. Similarly, we have effected changes in an enzyme; for example, an amylase; by reaction of the enzyme with a lipase.

Using starch hydrolysate molecules as an example of lipid containing natural product molecules, and referring to such molecules as participants in further enzymic hydrolysis, we have found (and have reported in the above mentioned copending application) that a lipase can influence such hydrolysis in three important ways:

(1) A lipase can effect an increased activation of starch hydrolysate molecules for further hydrolysis:

(2) A lipase can liberate latent hydrolases from starch hydrolysate molecules, the molecules then undergoing typical enzymic hydrolysis in the absence of added dextrogenic enzyme; and (3) A lipase can effet the activation of an added amylase used in the hydrolysis.

The foregoing and related uses of a lipase have proved to have substantial economic value; particularly when the substrate molecule is starch, a starch hydrolysate, or an enzyme; and, consequently, this success leads to hope that there may be other and better ways to effect novel and more useful configuration changes in such substrate molecules. One possibility—a change in the lipase molecule itself—does not appear to have been reported.

OBJECTS

It is therefore an object of our invention to provide for the preparation of natural product molecules in uniquely activated states.

It is, more particularly, an object of our invention to provide for the preparation of starches and starch hydrolysates in uniquely activated states.

It is a further object to alter starch or starch hydrolysate molecules by reaction with a lipase which has been altered to provide unique reaction consequences.

It is a specific object of our invention to provide a novel enzyme comprising a complex of zinc and a lipase.

It is also a specific object to provide an improved process for the preparation of paper surface sizing.

It is a further specific object to provide an improved process for the preparation of dextrose.

It is a further specific object of the invention to provide an improved process for the liberation of latent hydrolases from starch hydrolysate molecules.

We have now found that the foregoing and related objects can be attained by the preparation and use of a zinc-lipase complex, the latter being prepared by effecting the introduction of zinc atoms into a complex with lipase molecules.

To prepare the zinc-lipase complex we prefer to contact a lipase with a zinc salt, preferably zinc chloride, in aqueous solution. The zinc which is, at first, present as zinc ions becomes complexed with the lipase. The latter reaction takes place in a matter of minutes, fifteen minutes being sufficiently long in substantially all cases. The solution may be at room temperature and is preferably buffered, a pH of about 7.40 being suitable. We prefer steapsin as the lipase but any lipase can be used.

The proportion of zinc to lipase can vary considerably. For example, we have used a zinc-lipase complex in which there was as low as 0.05 percent zinc by weight and a complex in which there was as high as 80 percent zinc by weight. We are not sure of the molecular nature of the complex but believe the zinc chelates protein moieties of the lipase. We believe also that the most effective proportion of zinc is determined, at least in part, by the number of active centers on the substrate molecule to be treated with the zinc-lipase complex and by the proportion of zinc required to form, for example, an initial starch-lipid-zinc-lipase complex. Thus, a starch molecule with inherent lipid fragments appears to have fewer active centers than a comparable starch hydrolysate molecule, and relatively less zinc in the zinc-lipase complex is required for activation of starch molecules than for activation of starch hydrolysate molecules. Thus a typical zinc concentration in a zinc-lipase complex for use in the activation of starch is about 0.05–3.0% whereas a typical zinc concentration in a complex for use in activating a starch hydrolysate can be about 80 percent.

The zinc-lipase complex can be used as an enzyme in reactions in which a lipase is generally used and under substantially the same reaction conditions as the uncomplexed lipase.

As indicated above, we have reported in our above mentioned copending application on the reaction of a lipase with starch molecules containing intrinsic atypical lipid fragments, the starch molecules being altered in a manner to manifest unique activation states in subsequent reactions of the starch. We now find that our zinc-lipase complex is superior to lipase alone in the attainment of unique activation states, particularly when the starch is to be subjected to enzymic hydrolysis. By way of example, we will now refer to the alteration of starch prior to its being "thinned" for use as a paper surface sizing.

The thinning of, or enzyme conversion of, starch and the use of the resulting product as a paper coating or surface sizing is a higly developed art. To this end, commercial corn starch has been treated with an alpha amylase to attain a limited hydrolysis and, for example, a Dudley viscosity of about 40–75 seconds. Improved coating properties and surface sizing properties have been achieved by a variety of starch pre-treatments. We have selected one such pretreated starch, referred to herein as Commercial No. 1, as a standard against which to measure an advance in the art. We make this selection because we believe Commercial No. 1 is the best of the commercially accepted starch derivatives used as a paper sizing. Commercial No. 2 and Commercial No. 3 (referred to in the tables) represent examples of less desirable surface sizings.

To obtain a paper surface sizing which is at least equal to Commercial No. 1 in all properties, and better in some, we first activate the starch by effecting an enzymic reaction between the starch and our zinc-lipase complex. The zinc-steapsin may be added to a starch slurry in a concentration of 0.004 percent, for example, based on the dry weight of the starch. A pH of about 6.8–7.4, a temperature of about 40° C., and a reaction time of 6 hours are suitable. The starch slurry can then be adjusted to a pH of about 6.6, filtered, washed and air dried. The altered starch may then be enzyme converted as follows:

The altered starch is slurried at a solids level of about 12–16 percent, at a pH of about 6.8, and a commercial alpha amylase is added at a level, for example, of about 0.003–0.01 percent of the starch weight. The starch-alpha amylase mixture is then heated to 77° C., held at that temperature for 23 minutes, heated to 95° C., held at that temperature for 10 minutes, cooled to 66° C., and then is applied to paper as a surface sizing.

We have found that such surface sizings prepared by the method of our invention are comparable to the Commercial No. 1 product in final Dudley viscosity, Brookfield viscosity, opacity of coating, wax pick of coating, and printing quality of paper. We have also found that our coating is superior to the Commercial No. 1 product in having a lower peak viscosity and in having a more uniform Dudley viscosity from test to test.

The lower peak viscosity of our product during the heating thereof leads to a saving in production costs in that a greater quantity of our starch-enzyme mixture can be heated in a given kettle than prior art starches because of less thickening of our altered starch during the cooking process.

The uniformity of the viscosity of our paper surface sizing is probably its most outstanding characteristic, making its conversion to the same end viscosity easier. (See end viscosities in Table 9.)

As mentioned above, starches, as well as starch hydrolysates, are used as starting materials in the formation of maltose and dextrose. In our process we carry out the hydrolysis in the usual manner with two important exceptions:

(1) The starch, or the starch hydrolysate, is first altered by enzymic reaction with an effective proportion of a zinc-lipase complex:

(2) Hydrolysis can then be carried out, if desired, in the absence of an added dextrogenic enzyme for the reason that the zinc-lipase complex liberates latent hydrolases.

In the manner described above, other natural product molecules, subject to alteration by enzymic reaction with a lipase, can be altered with our zinc-lipase complex. One such particularly important natural product molecule is an enzyme such as an amylase.

Although we do not wish to be limited by theoretical considerations, we believe that our speculations on the reasons why the zinc-lipase complex effects somewhat different results than the uncomplexed lipase may be helpful to an understanding of our invention. We have already pointed out (in the above mentioned copending application) that lipase appears to act on starch, for example, by altering lipid fragments of the starch molecule in a manner to influence favorably certain reactive sites. A unique starch configuration appears to result from such enzymic treatment.

We believe that the improved results obtained by the use of zinc-lipase instead of uncomplexed lipase results from (1) the retention by the starch, for example, of a larger proportion of complex than of straight lipase; (2) the relatively larger size of the complex molecule than the straight lipase molecule; and (3) the orienting influence of the retained complex in the altered starch toward subsequently used enzymes such as amylases.

Example 1

We added 0.10 gram of $ZnCl_2$ to 22.5 mls. of a phosphate buffered (pH=7.40) solution containing 0.01125 gram of steapsin. The ratio of zinc chloride to steapsin was about 8.9 and the ratio of zinc to steapsin was about 4.3. The resulting solution was allowed to stand for 15 minutes; at which time the zinc, initially present as zinc ions, was present substantially in the form of a zinc-steapsin complex comprising about 80 percent zinc.

To test the effectiveness of the zinc-steapsin complex, the complex was added to 700 mls. of a liquor at a pH of 6.8 a temperature of 55° C., and containing 280 grams of a starch hydrolysate at a DE of 14.24 (to activate the hydrolysate). No other enzyme was added (specifically no dextrogenic enzyme was added.) DE values were determined in the resulting liquor at various intervals of time. These are reported in Table 1.

As a first control, the foregoing procedure was followed except that the zinc chloride was not added to the steapsin to form a complex but was added to the hydrolysate liquor after untreated steapsin was added thereto.

As a second control, the zinc was omitted completely but 0.10 gram calcium phosphate was added to the steapsin, calcium being an activator of some enzymes.

As a third control, the starch hydrolysate was maintained at a pH of 6.80 and a temperature of 55° C. with no addition of either steapsin or salt. The control results are also shown in Table 1.

Example 2

Example 1 was repeated except that a starch hydrolysate with a DE of 24.01 was used. Results in terms of DE values at various times are shown in Table 2. It may be noted in Table 2 that when zinc chloride was added to the hydrolysate liquor (instead of being complexed with the steapsin) it proved to be inhibitory to the steapsin.

Example 3

We added 0.3 ml. of 0.010% $ZnCl_2$ (0.00003 gm. $ZnCl_2$) to 40 mls. of a phosphate buffered (pH=7.40) solution containing 0.02 gram steapsin. The ratio of zinc chloride to steapsin was about 1 to 700, and the ratio of zinc to steapsin was about 1 to 1400. The resulting solution was allowed to stand for 15 minutes; at which time the zinc, initially present as zinc ions, was present substantially in the form of a zinc-steapsin complex comprising about 0.07 percent zinc.

To test the effectiveness of the zinc-steapsin complex, it was added to a slurry containing 500 grams of pearl corn starch. The resulting mixture was held at a pH of 7.40 and a temperature of 40° C. for 6 hours (to activate the starch). The pH was then adjusted to 5.50 and the starch was filtered, washed, and air dried. The treated dried starch was then converted to dextrose as follows: The starch was slurried in 2800 mls. of water at a pH of 6.80. A commercial alpha amylase (0.20 gram) was added and the mixture was held for 10 minutes at 72° C. It was then cooled to 55° C., the pH was adjusted to 5.5, and amyloglucosidase (0.20 gram) was added. DE determinations were made at the intervals shown in Table 3.

A first control involved the same procedure as described except that an untreated steapsin was used.

A second control involved the same procedure except that 0.00003 gram zinc chloride (no steapsin) was added to the starch.

A third control involved the use of the starch with no treatment with either steapsin or zinc chloride. Results with the controls are also shown in Table 3.

Example 4

We added 0.00122 gram zinc chloride (9 mls. of 0.001 M $ZnCl_2$) to 40 mls. of a phosphate buffered (pH=7.40) solution containing 0.02 gram of steapsin. The ratio of zinc chloride to steapsin was about 1 to 16 and the ratio of zinc to steapsin was about 1 to 33. The resulting solution was allowed to stand for 15 minutes; at which time the zinc, initially present as zinc ions, was present substantially in the form of a zinc-steapsin complex comprising about 3 percent zinc. The solution containing the complex was then added to a starch slurry (500 grams corn starch in 2500 mls. distilled water) at a pH of 7.40 and a temperature of 40° C. This gave a zinc-steapsin level of 0.004 percent based on the dry weight of the starch.

The starch and zinc-steapsin mixture was allowed to react for 6 hours to effect the alteration of the starch. The pH was then adjusted to a pH of 6.6 and the starch was filtered, washed, and air dried. The starch was then evaluated as an "enzyme conversion starch" in the following manner:

The altered starch was slurried at 12% solids in distilled water and the pH was adjusted to 6.8. "Amyliq tablets" (an alpha-amylase concentrate marketed by the Wallerstein Co.) were added at the level of 0.010% based on the dry weight of the starch. The altered starch-amylase mixture was then heated rapidly to 77° C. in a Brabender Amylograph and held for 23 minutes. Heating to 95° C. and holding for 10 minutes followed. The mixture was then cooled to 70° C. The converted starch was then evaluated in terms of Dudley and Brookfield viscosities. Parallel controls involved the same procedure except that (1) unaltered corn starch (no steapsin and no zinc chloride), (2) starch plus zinc chloride (no steapsin), and (3) starch plus steapsin (no zinc) were used. Various commercially available converted starches were used for comparison. Results are shown in Tables 4, 5, and 6. The viscosities listed in Tables 4 and 5 show that converted starch made from a zinc-steapsin altered starch is at least equal to the best commercially available converted starch and in some respects is better. Table 6 shows a significant alteration of the analysis of the starch by both the steapsin and the zinc-steapsin complex (as compared to unaltered starch or zinc treated starch).

Example 5

This example describes the use of our invention on a plant scale.

We added 15 grams of zinc chloride to 10 gallons of tap water, phosphate buffered to a pH of 7.4, and containing 2.4 pounds of steapsin. The ratio of zinc chloride to steapsin was about 1 to 72 and the ratio of zinc to steapsin was about 1 to 150. The resulting solution was allowed to stand for 15 minutes, at which time the zinc, initially present as zinc ions, was present substantially in the form of a zinc-steapsin complex comprising about 0.66 percent zinc.

The solution containing the complex was then added to a starch slurry of 60,300 pounds of corn starch in 14,152 gallons of water at a pH of 7.40 and a temperature of 40° C. The resulting mixture was permitted to react for 5 hours to effect the alteration of the starch. An aliquot of the resulting mixture containing the altered starch was enzyme converted in the laboratory (as in Example 4) and was compared with a starch which had been altered by uncomplexed lipase under the same conditions. Results are shown in Tables 7 and 8. The balance of the zinc-lipase altered starch was delivered to a paper mill where it was converted in 1400 to 1600 pound batches using a commercially available alpha-amylase at a starch solids of 16% and an amylase level of 0.0031% based on the starch. Products of the separate batches were tested as paper surface sizings. Results (and comparisons with Commercial No. 1) are shown in Tables 9 and 10.

It is to be understood that the foregoing examples and description are for the purposes of illustration only, and that various changes may be made therein without departing from the spirit and scope of the invention.

TABLE 1

| | DE | | | |
|---|---|---|---|---|
| Time (hours) | Hydrolysate plus Zn-Steapsin | Hydrolysate plus Steapsin plus Zn++ | Hydrolysate plus Steapsin plus Ca++ | Hydrolysate Alone |
| 0 | 14.24 | 14.24 | 14.24 | 14.24 |
| 3.0 | 22.36 | 20.09 | | |
| 5.5 | 25.59 | 22.91 | 23.70 | |
| 7.5 | 27.73 | 24.25 | | |
| 18.5 | 31.97 | 28.48 | 28.30 | |
| 21.0 | | 29.04 | 28.80 | |
| 24.0 | 34.82 | 29.54 | 29.50 | |
| 27.0 | 36.48 | 31.86 | 31.30 | |
| 30.0 | 38.84 | 31.87 | | 14.24 |

TABLE 2

| | DE | | | |
|---|---|---|---|---|
| Time (hours) | Hydrolysate plus Zn-Steapsin | Hydrolysate plus Steapsin plus Zn++ | Hydrolysate plus Steapsin | Hydrolysate Alone |
| 0 | 24.01 | 24.01 | 24.04 | 24.01 |
| 3.0 | 24.80 | 28.63 | | |
| 5.5 | 31.19 | 29.25 | 31.90 | |
| 7.5 | 35.80 | 30.10 | 33.10 | |
| 18.5 | 45.81 | 32.95 | 37.50 | |
| 21.0 | 46.34 | | 38.40 | |
| 24.0 | 48.11 | | 38.90 | |
| 27.0 | 49.21 | | 39.70 | |
| 30.0 | 50.07 | 32.98 | 41.00 | 24.01 |

TABLE 3

| | DE | | | |
|---|---|---|---|---|
| Time (hours) | Starch plus Zn-Steapsin | Starch plus Steapsin | Starch plus Zinc | Starch Alone |
| 4 | 33.04 | 22.00 | 20.43 | 22.44 |
| 16 | 57.21 | 46.50 | 41.91 | 41.92 |
| 20 | 69.42 | 51.00 | 47.03 | 46.32 |

TABLE 4

| | Amylograph Conversion Properties (BU) | | | Dudley Viscosity |
|---|---|---|---|---|
| Starch Sample | Peak Visc. | Visc. at 10 min., Hold at 77° C. | Visc. at 95° C. | Seconds at 66° C., 12% Solids Conversion |
| Zinc-steapsin treated | 220 | 10 | 10 | 36 |
| Zinc treated alone | 860 | 170 | 60 | 48 |
| Starch alone | 980 | 240 | 70 | 60 |
| Steapsin alone | 900 | 270 | 60 | 60 |
| Commercial #1 | 660 | 30 | 10 | 38 |
| Commercial #2 | 1,050 | 180 | 100 | 62 |
| Commercial #3 | 1,010 | 180 | 80 | 60 |

TABLE 5

| | Brookfield Viscosity (cps.) [1] | | |
|---|---|---|---|
| Starch Sample | 40° C. | 60° C. | 80° C. |
| Zinc-steapsin treated | 18 | 14 | 10 |
| Zinc treated only | 25 | 20 | 16 |
| Starch alone | 28 | 22 | 17 |
| Steapsin alone | 30 | 24 | 17 |
| Commercial #1 | 15 | 13 | 11 |
| Commercial #2 | 42 | 26 | 20 |
| Commercial #3 | 41 | 24 | 15 |

[1] No. 1 Spindle at 100 r.p.m.

TABLE 6

| | Component | | |
|---|---|---|---|
| Starch | Percent Lipids | Percent Ash | Percent Protein |
| Zinc-steapsin treated | .170 | .052 | .475 |
| Zinc treatment | [1] .450 | [1] .200 | [1] .420 |
| Starch alone | .460 | .251 | .433 |
| Steapsin alone | .190 | .082 | .475 |

[1] May be attributed to a washing effect.

TABLE 7

| | | | Dudley Visc. | Brookfield Visc. (cps.), #1 Sp. at 100 r.p.m. | | |
|---|---|---|---|---|---|---|
| Starch Sample | Peak Visc. | Visc. at 77° C. | (secs.) at 66° C., 12% Solids | 40 | 60 | 80 |
| Zinc-steapsin | 470 | 40 | 37 | 22 | 16 | 11 |
| Steapsin alone | 900 | 100 | 70 | 30 | 26 | 20 |

TABLE 8
[Results: Example II, Table 2]

Analysis of Altered Starch

| Starch Sample | Percent Lipids | Percent Protein | Percent Ash | Retention [1] |
|---|---|---|---|---|
| Zinc-steapsin | .120 | .340 | .160 | 97 |
| Steapsin alone | .250 | .335 | .140 | 80 |

[1] Relative retention of $TiO_2$.

TABLE 9

| Batch No. | Starch | Dudley Visc. (Secs.) at 66° C./ 16% Solids |
|---|---|---|
| 1 | Commercial No. 1 | 68 |
| 2 | do | 69 |
| 3 | do | 73 |
| 4 | do | 70 |
| 5 | do | 72 |
| 6 | do | 69 |
| 1 | Our Treated Starch | 68 |
| 2 | do | 68 |
| 3 | do | 67 |
| 4 | do | 68 |
| 5 | do | 68 |
| 6 | do | 67 |

TABLE 10

Paper Properties

| Starch | Wax Pick F | Wax Pick W | Percent Ash | Opacity | Printing |
|---|---|---|---|---|---|
| Treated | 11 | 18 | 16.2 | 95.0 | Good. |
| | 11 | 18 | 16.2 | 95.2 | Good. |
| | 12 | 18 | 14.4 | 95.0 | Good. |
| | 13 | 18 | 15.0 | 95.0 | Good. |
| | 13 | 18 | 15.5 | 95.0 | Good. |
| | 13 | 18 | 14.9 | 95.0 | Good. |
| | 13 | 18 | 14.8 | 95.0 | Good. |
| Commercial No. 1 | 13 | 18 | 16.1 | 95.0 | Good. |
| | 13 | 18 | 15.7 | 94.5 | Good. |
| | 13 | 18 | 16.4 | 94.5 | Good. |
| | 11 | 18 | 16.2 | 95.0 | Good. |
| | 13 | 18 | 15.7 | 94.5 | Good. |
| | 13 | 18 | 16.4 | 94.5 | Good. |
| | 11 | 18 | 17.3 | 94.8 | Good. |

We claim:

1. The method of preparing a lipase preparation of altered activity that comprises reacting in an aqueous medium said lipase preparation with 0.05 to 80 percetn of zinc ion based on the total weight of zinc and lipase preparation.

2. The method according to claim 1 wherein the zinc weight is about 0.05–3.0 percent of said molecular complex.

3. The method according to claim 1 wherein the zinc weight is about 80 percent of said molecular complex.

4. The method according to claim 1 wherein the zinc salt is zinc chloride.

5. The method that comprises treating a material containing lipid moieties with a zinc-lipase enzyme complex containing at least 0.05% zinc, said material being selected from the group consisting of starch and partial hydrolysates of starch.

6. The method of claim 5 wherein the lipid moiety is a fragment of a starch molecule.

7. The method of claim 5 wherein the lipid moiety is a fragment of a starch hydrolysate molecule.

8. The method according to claim 6 which comprises the additional step of effecting the hydrolysis of said starch.

9. The method according to claim 8 which comprises the use of a dextrogenic enzyme to effect said hydrolysis.

10. The method according to claim 8 which comprises the use of an amylase to effect said hydrolysis.

11. The method according to claim 7 which comprises the additional step of effecting the hydrolysis of said starch hydrolysate.

12. The method according to claim 11 wherein said hydrolysis is accelerated by enzymes liberated by the zinc-lipase alteration of said hydrolysates.

References Cited

UNITED STATES PATENTS 2,153,445  4/1939  Willaman et al. ____ 195—114 X
2,302,310  11/1942  Glarum et al.

OTHER REFERENCES

Ory et al., Journal of Lipid Research, vol. 1, No. 3, pp. 208–213 (April 1960).

LIONEL M. SHAPIRO, Primary Examiner

U.S. Cl. X.R.

106—210; 162—175; 195—31, 63, 68

PO-1050
(5/69)

UNITED STATES PATENT OFFICE
CERTIFICATE OF CORRECTION

Patent No. 3,498,882  Dated March 3, 1970

Inventor(s) Saul Rogols and Robert L. High

It is certified that error appears in the above-identified patent and that said Letters Patent are hereby corrected as shown below:

Column 1, line 11, for "A process in which a lipase enzyme preparation is starch or starch hydrolysateand the treated starch can be containing complex." read ---A process in which a lipase enzyme preparation is reacted in aqueous medium with zinc ion to form a zinc-containing complex.---. Column 4, line 20, for "DE of" read ---DE (dextrose equivalent) of---. Column 7, line 37, for "Wax Pick" read ---Wax Pick*---. Column 7, line 53, read ---*The wax pick test was performed on both the top or felt (F) side of the wire(W) side of the paper.---.

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents